ial No. 833,726. Divided and this application filed March 8, 1915. Serial No. 12,939.

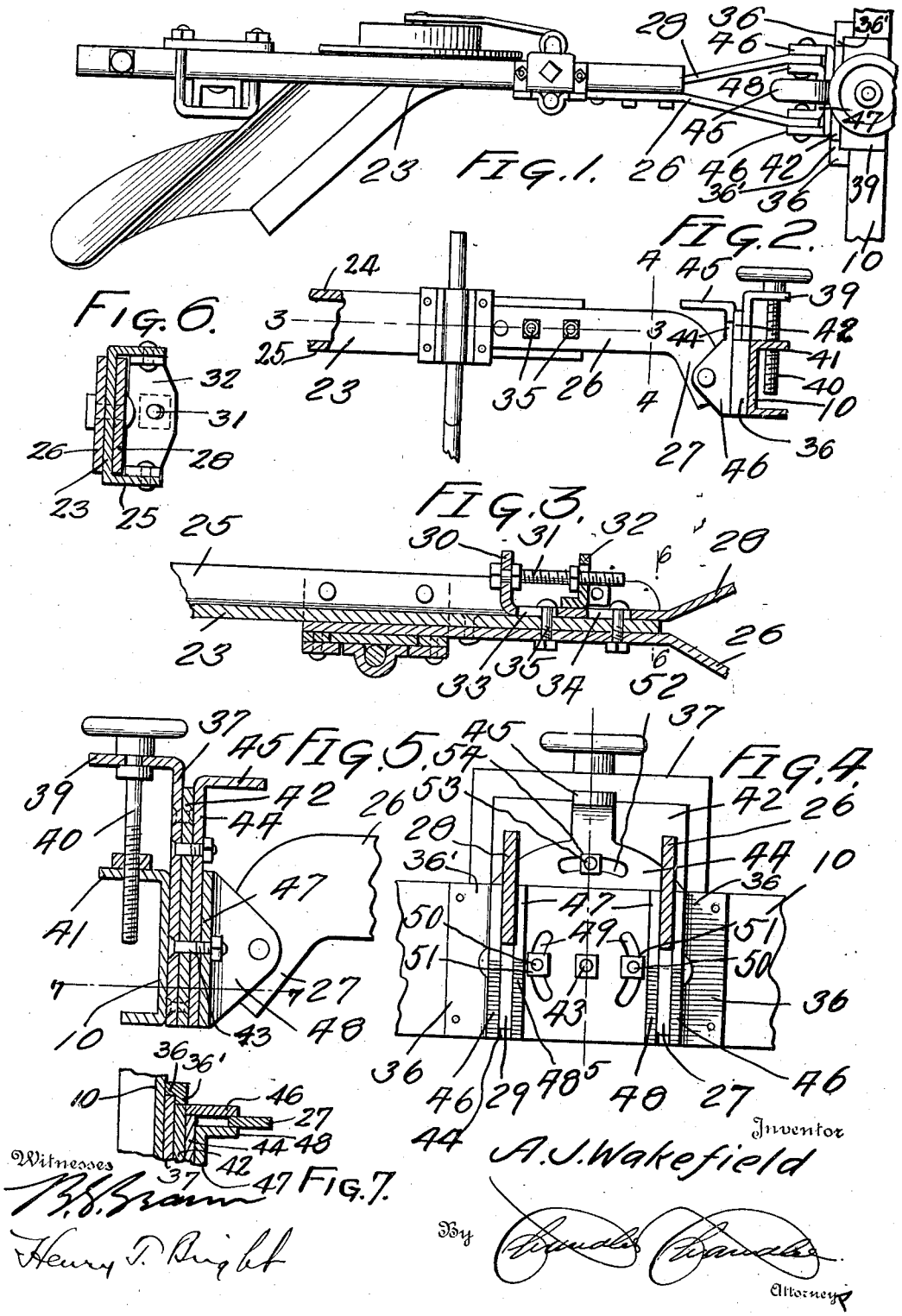

UNITED STATES PATENT OFFICE.

ALMOND J. WAKEFIELD, OF FAULKTON, SOUTH DAKOTA.

GANG-PLOW.

1,318,036.     Specification of Letters Patent.     Patented Oct. 7, 1919.

Original application filed April 22, 1914, Serial No. 833,726. Divided and this application filed March 8, 1915. Serial No. 12,939.

*To all whom it may concern:*

Be it known that I, ALMOND J. WAKEFIELD, a citizen of the United States, residing at Faulkton, in the county of Faulk, State of South Dakota, have invented certain new and useful Improvements in Gang-Plows; and I do hereby declare the following to be a full, clear, and exact description of the invention, such as will enable others skilled in the art to which it appertains to make and use the same.

This invention relates to Gang Plows and particularly to a structure whereby each unit of the gang may be adjusted independently.

The object of the invention resides in the provision of a structure of the type named whereby the gang units may be adjusted in various ways to meet the requirements of the particular work in hand.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of one of the units of a plow gang disclosing the invention;

Fig. 2, a partial side view of what is shown in Fig. 1;

Fig. 3, a section on the line 3—3 of Fig. 2;

Fig. 4, a section on the line 4—4 of Fig. 2;

Fig. 5, a section on the line 5—5 of Fig. 4, and

Fig. 6, a section on the line 6—6 of Fig. 3.

Fig. 7 is a detail fragmentary section on line 7—7 of Fig. 5.

Referring to the drawings 10 indicates the connecting bar of a plow gang which is adapted to be attached to a traction engine in the manner fully described in my copending application, filed April 22, 1914, serial No. 833,726, and of which this application is a division. As all of the plows of the gang are connected to the bar 10 in a similar manner only the connection between one of said plows and said bar will be illustrated and described. The plow shown embodies a beam 23 having a U-shaped cross section and including flanges 24 and 25. Secured to one side of the beam 23 is an arm 26 which is directed laterally at its outer end and terminates in a downwardly directed portion 27. Disposed against the inner side of the web of the beam 23 is an arm 28 which is also directed laterally at its outer end and terminates in a downwardly directed portion 29 corresponding to the portion 27 of the arm 26. The inner end of the arm 28 is bent laterally as at 30 and rotatably mounted in the laterally directed portion 30 in an adjusting screw 31 engaged through a plate 32 connecting the flanges 24 and 25 of the beam 23. The arm 28 is provided with elongated slots 33 and 34 through which are engaged bolts 35 respectively, said bolts also extending through the beam 23 and the arm 26. Mounted on the rear side of the bar 10 are guide ribs 36 between which is slidably engaged a plate 37 the upper end of which is provided with a forwardly directed flange 39 in which is rotatably mounted a vertical adjusting screw 40. This screw 40 is threaded in a flange 41 formed on the bar 10. By this construction it will be apparent that the rotation of the screw 40 will effect a vertical adjustment of the plate 37. The ribs 36 include inturned flanges 36' engaging over the plate 37. Secured against the outer face of the plate 37 and slidable between the inner edges of the flanges 36' is a plate 42 the outer face of which lies flush with the outer side of the flanges 36'. Pivotally mounted against the outer face of the plate 42 upon a bolt 43 is a plate 44 provided at its upper end with a hand grip 45. The plate 44 is provided with rearwardly directed ears 46 disposed at the sides thereof respectively. Secured to the plate 44 between the ears 46 is a plate 47 which is also provided with ears 48 disposed in spaced relation to respective ears 46. The plates 44 and 47 are provided with registering arcuate slots 49 disposed concentrically with the bolt 43 and extending through these registering slots 49 are bolts 50 carried by the plates 37 and 42. Threaded on the bolts 50 are nuts 51. The plate 44 is also provided with an arcuate slot 52 disposed concentric to the bolt 43 and through which projects a bolt 53 carried by the plates 42 and 37. Threaded on the bolt 53 is a nut 54.

By this construction it will be obvious that the plates 44 and 47, when the nuts 51 and 54 are released can be rotated about the bolt 43 and then locked in any desired position by screwing the nuts 51 and 54 home. The downwardly directed outer ends 27 and 29 of the arms 26 and 28 respectively are pivotally mounted between respective pairs of ears 46 and 48 whereby any vertical adjustment of the plate 37 or rotative adjustment of the plates 47 and 44 will effect a corresponding adjustment of the beam 23. It will be obvious that by releasing the nut 35 and operating the screw 31 the arm 28 will be moved longitudinally with the result that the beam 23 will be swung laterally at its rear end and said beam can then be locked in this adjusted position by screwing the nuts 35 home.

What is claimed is:—

A plow connection including a draft member, a plate carried thereby for vertical sliding movement, a horizontal pivot bolt carried by said plate, a second plate carried on said bolt, means adjustably holding the first plate against pivotal movement, outstanding ears on the second plate and a plow beam pivotally connected with the said ears.

In testimony whereof I affix my signature in the presence of two witnesses.

ALMOND J. WAKEFIELD.

Witnesses:
P. W. LOOMIS,
J. JESEHKE.

Copies of this patent may be obtained for five cents each, by addressing the "Commissioner of Patents, Washington, D. C."